(12) United States Patent  
Brosnan (10) Patent No.: US 9,310,940 B2
(45) Date of Patent: Apr. 12, 2016

(54) CAPACITIVE TOUCHSCREEN OR TOUCH PANEL WITH FINGERPRINT READER

(75) Inventor: Michael Brosnan, Fremont, CA (US)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 1318 days.

(21) Appl. No.: 13/008,006

(22) Filed: Jan. 17, 2011

(65) Prior Publication Data

US 2012/0182253 A1    Jul. 19, 2012

(51) Int. Cl.
| | |
|---|---|
| *G06F 3/041* | (2006.01) |
| *G06F 3/044* | (2006.01) |
| *G06K 9/00* | (2006.01) |
| *G06F 21/00* | (2013.01) |

(52) U.S. Cl.
CPC .............. *G06F 3/044* (2013.01); *G06F 3/0416* (2013.01); *G06F 21/00* (2013.01); *G06K 9/0002* (2013.01); *G06F 2203/04112* (2013.01)

(58) Field of Classification Search
CPC .... G07F 17/3206; G06F 21/602; G06F 21/32
USPC ..................... 345/173, 174; 463/29
See application file for complete search history.

(56) References Cited

U.S. PATENT DOCUMENTS

| | | | |
|---|---|---|---|
| 5,420,936 A | 5/1995 | Fitzpatrick et al. | |
| 6,360,004 B1 | 3/2002 | Akizuki | |
| 6,647,133 B1 | 11/2003 | Morita et al. | |
| 7,116,805 B2 | 10/2006 | Machida | |
| 7,812,827 B2 * | 10/2010 | Hotelling et al. | 345/173 |
| 8,077,147 B2 * | 12/2011 | Krah et al. | 345/163 |
| 8,599,150 B2 * | 12/2013 | Philipp | 345/173 |
| 2006/0284853 A1 | 12/2006 | Shapiro | |
| 2008/0042983 A1 | 2/2008 | Kim et al. | |
| 2008/0211779 A1 * | 9/2008 | Pryor | 345/173 |
| 2008/0278178 A1 * | 11/2008 | Philipp | 324/662 |
| 2010/0225607 A1 * | 9/2010 | Kim | 345/173 |
| 2011/0102567 A1 * | 5/2011 | Erhart | 348/77 |

FOREIGN PATENT DOCUMENTS

| | | |
|---|---|---|
| KR | 1020080028852 A | 4/2008 |
| KR | 1020090071374 A | 7/2009 |
| KR | 1020100099062 A | 9/2010 |

\* cited by examiner

*Primary Examiner* — Calvin C Ma
(74) *Attorney, Agent, or Firm* — Winston Hsu; Scott Margo (57) ABSTRACT

Various embodiments of a capacitive touchscreen or touch panel having dual finger or hand navigation and fingerprint reading capabilities. In one embodiment, fingerprints are read and processed by the same capacitive touchscreen controller that reads and processes capacitively-sensed finger or hand touches made across the touchscreen or touch panel. A small portion of the capacitive touchscreen or touch panel is dedicated to reading an authorized user's fingerprints, while a larger or main portion of the capacitive touchscreen or touch panel is dedicated to sensing a user's finger or hand navigation across the touchscreen or touch panel.

30 Claims, 7 Drawing Sheets

CAPACITIVE TOUCHSCREEN OR TOUCH PANEL WITH FINGERPRINT READER

FIELD OF THE INVENTION

Various embodiments of the invention described herein relate to the field of capacitive sensing input devices generally, and more specifically to touchscreen or touch panel systems, devices, components and methods configured to detect touches and near touches on one portion of a capacitive touchscreen or touch panel, and to read fingerprints on another portion of a capacitive touchscreens and touch panel.

BACKGROUND

Two principal capacitive sensing and measurement technologies are currently employed in most touchpad and touchscreen devices. The first such technology is that of self-capacitance. Many devices manufactured by SYNAPTICS™ employ self-capacitance measurement techniques, as do integrated circuit (IC) devices such as the CYPRESS PSOC.™ Self-capacitance involves measuring the self-capacitance of a series of electrode pads using techniques such as those described in U.S. Pat. No. 5,543,588 to Bisset et al. entitled "Touch Pad Driven Handheld Computing Device" dated Aug. 6, 1996.

Self-capacitance may be measured through the detection of the amount of charge accumulated on an object held at a given voltage (Q=CV). Self-capacitance is typically measured by applying a known voltage to an electrode, and then using a circuit to measure how much charge flows to that same electrode. When external objects are brought close to the electrode, additional charge is attracted to the electrode. As a result, the self-capacitance of the electrode increases. Many touch sensors are configured such that the grounded object is a finger grounded through the human body, where the body is essentially a capacitor to a surface where the electric field vanishes, and typically has a capacitance of around 100 pF.

Electrodes in self-capacitance touchpads are typically arranged in rows and columns. By scanning first rows and then columns the locations of individual mutual capacitance changes induced by the presence of a finger, for example, can be determined. To effect accurate multi-touch measurements in a touchpad, however, it may be required that several finger touches be measured simultaneously. In such a case, row and column techniques for self-capacitance measurement can lead to inconclusive results.

One way in which the number of electrodes can be reduced in a self-capacitance system is by interleaving the electrodes in a saw-tooth pattern. Such interleaving creates a larger region where a finger is sensed by a limited number of adjacent electrodes allowing better interpolation, and therefore fewer electrodes. Such patterns can be particularly effective in one dimensional sensors, such as those employed in IPOD click-wheels. See, for example, U.S. Pat. No. 6,879,930 to Sinclair et al. entitled Capacitance touch slider dated Apr. 12, 2005.

The second primary capacitive sensing and measurement technology employed in touchpad and touchscreen devices is that of mutual capacitance, where measurements are performed using a crossed grid of electrodes. See, for example, U.S. Pat. No. 5,861,875 to Gerpheide entitled "Methods and Apparatus for Data Input" dated Jan. 19, 1999. Mutual capacitance technology is employed in touchpad devices manufactured by CIRQUE™. In mutual capacitance measurement, capacitance is measured between two conductors, as opposed to a self-capacitance measurement in which the capacitance of a single conductor is measured, and which may be affected by other objects in proximity thereto.

In many computers, electronic devices, and mobile electronic devices, fingerprints are read by a fingerprint reader and associated fingerprint controller that are separate and apart from a capacitive touchscreen or touch panel and associated touchscreen controller that are configured to sense finger or hand touches.

What is needed is a capacitive measurement or sensing circuit or system that combines finger or hand touch detection and fingerprint reading functions using a single touchscreen or touch panel and/or a single touchscreen controller.

SUMMARY

In one embodiment, there is a provided a capacitive touchscreen or touch panel system comprising a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect to form first and second groups of individual cells having first and second cell dimensions associated therewith, respectively, the mutual capacitances changing in the presence of one or more fingers of a user or touch devices brought into proximity thereto, drive circuitry operably connected to the first plurality of drive electrodes, and at least first sense circuitry operably connected to the second plurality of sense electrodes of the first group and the second group, wherein the first group and first cell dimensions are configured to permit the detection by the first sense circuitry of the presence of the one or more fingers of the user or touch devices brought into proximity thereto, and the second group and second cell dimensions form a fingerprint reader configured to permit at least one fingerprint from the user's finger to be read by the first sense circuitry associated therewith.

In another embodiment, there is provided a method of detecting touches or near-touches and an authorized user's fingerprint on a capacitive touchscreen or touch panel system, the system comprising a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect to form first and second groups of individual cells having first and second cell dimensions associated therewith, respectively, the mutual capacitances changing in the presence of one or more fingers of a user or touch devices brought into proximity thereto, drive circuitry operably connected to the first plurality of drive electrodes, and at least first sense circuitry operably connected to the second plurality of sense electrodes of the first group and the second group, wherein the first group and first cell dimensions are configured to permit the detection by the first sense circuitry of the presence of the one or more fingers of the user or touch devices brought into proximity thereto, and the second group and second cell dimensions form a fingerprint reader configured to permit at least one fingerprint from the user's finger to be read by the first sense circuitry associated therewith, the method comprising sensing at least one touch or near touch of a finger, finger portion, hand or hand portion brought into proximity to the first group on the touchscreen or touch panel. The method may further comprise acquiring a fingerprint frame of the user's finger brought into contact with at least a portion of the second group on the touchscreen or touch panel.

Further embodiments are disclosed herein or will become apparent to those skilled in the art after having read and understood the specification and drawings hereof.

BRIEF DESCRIPTION OF THE DRAWINGS

Different aspects of the various embodiments will become apparent from the following specification, drawings and claims in which:

The drawings are not necessarily to scale. Like numbers refer to like parts or steps throughout the drawings.

DETAILED DESCRIPTIONS OF SOME EMBODIMENTS

Figure 1:
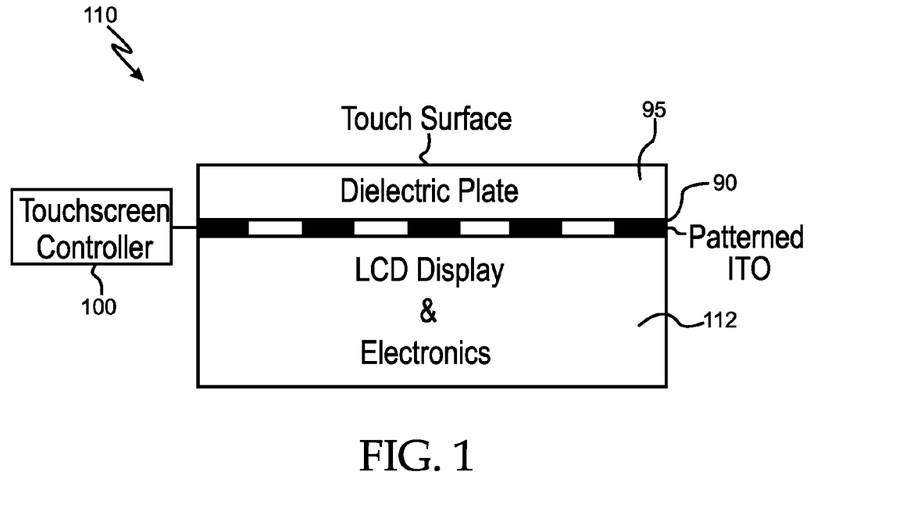
FIG. 1 shows a cross-sectional view of one embodiment of a capacitive touchscreen system.

As illustrated in FIG. 1, a capacitive touchscreen system 110 typically consists of an underlying LCD or OLED display 112, an overlying touch-sensitive panel or touchscreen 90, a protective cover or dielectric plate 95 disposed over the touchscreen 90, and a touchscreen controller, micro-processor, application specific integrated circuit ("ASIC") or CPU 100. Note that image displays other than LCDs or OLEDs may be disposed beneath touchscreen 90.

Figure 2:
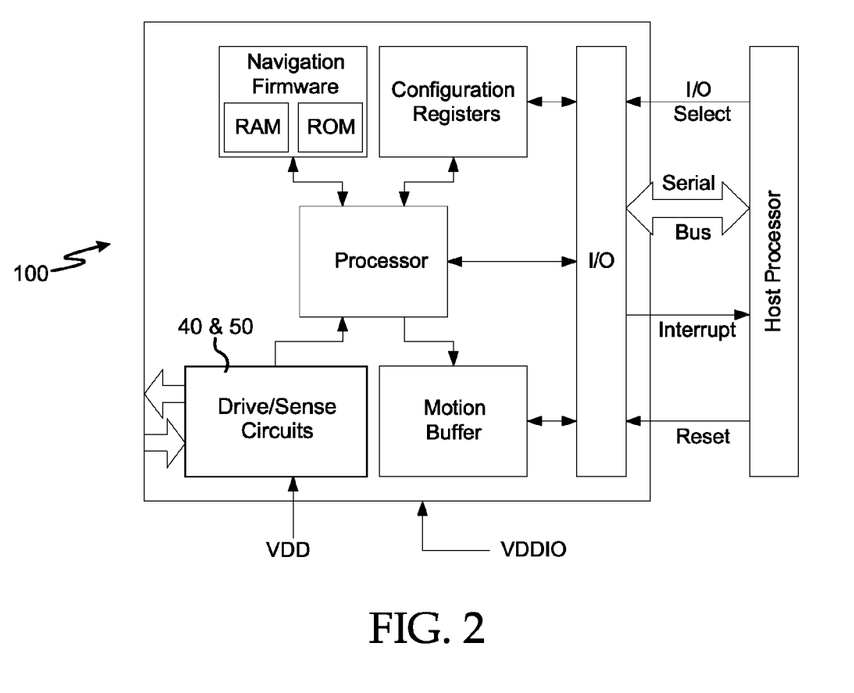
FIG. 2 shows a block diagram of a capacitive touchscreen controller.

FIG. 2 shows a block diagram of one embodiment of a touchscreen controller 100. In one embodiment, touchscreen controller 100 may be an Avago Technologies™ AMRI-5000 ASIC or chip 100 modified in accordance with the teachings presented herein. In one embodiment, touchscreen controller is a low-power capacitive touch-panel controller designed to provide a touchscreen system with high-accuracy, on-screen navigation.

Figure 3:
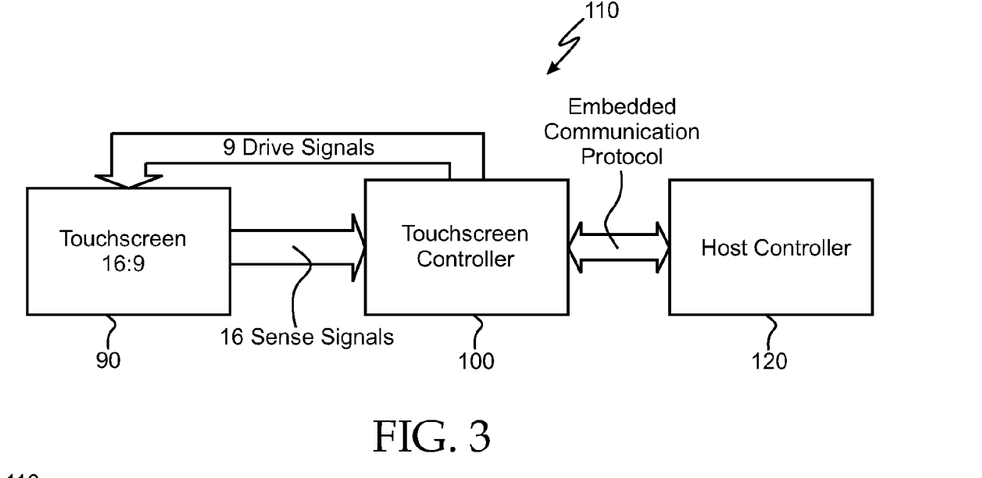
FIG. 3 shows one embodiment of a block diagram of a capacitive touchscreen system and a host controller.
Figure 4:
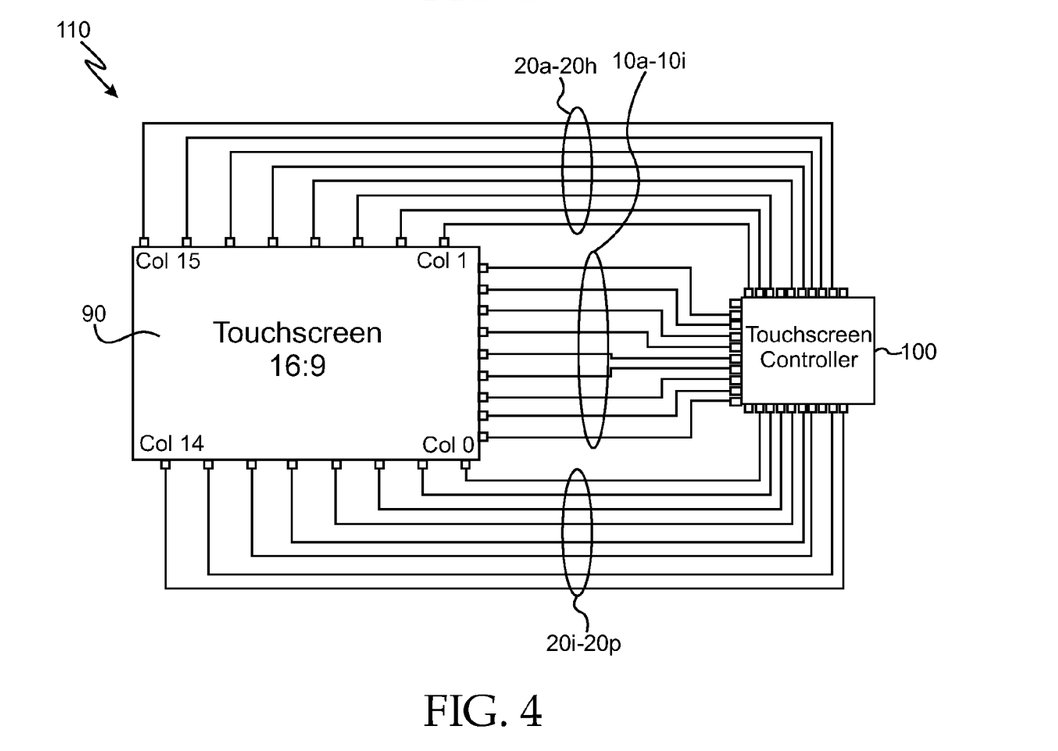
FIG. 4 shows a schematic block diagram of one embodiment of a capacitive touchscreen system.

Capacitive touchscreens or touch panels 90 shown in FIGS. 3 and 4 can be formed by applying a conductive material such as Indium Tin Oxide (ITO) to the surface(s) of a dielectric plate, which typically comprises glass, plastic or another suitable electrically insulative and preferably optically transmissive material, and which is usually configured in the shape of an electrode grid. The capacitance of the grid holds an electrical charge, and touching the panel with a finger presents a circuit path to the user's body, which causes a change in the capacitance.

Touchscreen controller 100 senses and analyzes the coordinates of these changes in capacitance. When touchscreen 90 is affixed to a display with a graphical user interface, on-screen navigation is possible by tracking the touch coordinates. Often it is necessary to detect multiple touches. The size of the grid is driven by the desired resolution of the touches. Typically there is an additional cover plate 95 to protect the top ITO layer of touchscreen 90 to form a complete touch screen solution (see, e.g., FIG. 1).

One way to create a touchscreen 90 is to apply an ITO grid on one side only of a dielectric plate or substrate. When the touchscreen 90 is mated with a display there is no need for an additional protective cover. This has the benefit of creating a thinner display system with improved transmissivity (>90%), enabling brighter and lighter handheld devices. Applications for touchscreen controller 100 include, but are not limited to, smart phones, portable media players, mobile internet devices (MIDs), and GPS devices.

Referring now to FIGS. 3 and 4, in one embodiment the touchscreen controller 100 includes an analog front end with 9 drive signal lines and 16 sense lines connected to an ITO grid on a touchscreen. Touchscreen controller 100 applies an excitation such as a square wave, meander signal or other suitable type of drive signal to the drive electrodes that may have a frequency selected from a range between about 40 kHz and about 200 kHz. The AC signal is coupled to the sense lines via mutual capacitance. Touching touchscreen or touch panel 90 with a finger alters the capacitance at the location of the touch. Touchscreen controller 100 can resolve and track multiple touches simultaneously. A high refresh rate allows the host to track rapid touches and any additional movements without appreciable delay. The embedded processor filters the data, identifies the touch coordinates and reports them to the host. The embedded firmware can be updated via patch loading. Other numbers of drive and sense lines are of course contemplated, such as 8×12 and 12×20 arrays.

Touchscreen controller 100 features multiple operating modes with varying levels of power consumption. In rest mode controller 100 periodically looks for touches at a rate programmed by the rest rate registers. There are multiple rest modes, each with successively lower power consumption. In the absence of a touch for a certain interval controller 100 automatically shifts to the next-lowest power consumption mode. However, as power consumption is reduced the response time to touches increases.

According to one embodiment, and as shown in FIG. 4, an ITO grid or other electrode configuration on touchscreen 90 comprises sense columns 20a-20p and drive rows 10a-10i, where sense columns 20a-20p are operably connected to corresponding sense circuits and rows 10a-10i are operably connected to corresponding drive circuits. One configuration for routing ITO or other drive and sense electrodes to lines to touchscreen controller 100 is shown in FIG. 4.

Those skilled in the art will understand that touchscreen controllers, micro-processors, ASICs or CPUs other than a modified AMRI-5000 chip or touchscreen controller 100 may be employed in touchscreen system 110, and that different numbers of drive and sense lines, and different numbers and configurations of drive and sense electrodes, other than those explicitly shown herein may be employed without departing from the scope or spirit of the various embodiments of the invention.

In various embodiments disclosed and described herein, and in addition to conventional capacitive touchscreen functionality for navigational tracking of finger or hand position across a touchscreen, a relatively small region on touchscreen or touch panel 90 is devoted to reading fingerprints from a user. This adds fingerprint recognition capability to finger or hand position navigation tracking functions in a capacitive touchscreen or touch panel system 100 without the added cost and circuitry associated with a separate fingerprint reader and its associated dedicated fingerprint controller.

In a conventional capacitive touchscreen or touch panel 90, transparent ITO grids are formed on a glass or plastic substrate. Finger positions are determined based on changes in mutual capacitance between the rows and columns of the grid, as described in detail above. Typical cell pitches or first group cell dimensions for such grids or cells are around 5 mm, which is generally suitable for resolving changes in mutual capacitance on the order of about 1 femtoFarad (fF). Other pitches or dimensions for such sensing grids or cells (or first groups of cells) employed in the navigation portion of touchscreen or touch panel 90 are also contemplated, including, but not limited to, grids or cells of the first group having pitches ranging between about 4 mm and about 6 mm, between about 3 mm and about 7 mm, between about 2 mm and about 8 mm, and between about 1 mm and about 10 mm.

Reliable and accurate detection of fingerprints, on the other hand, requires an ITO grid having much smaller cell pitches or second cell dimensions, such as say around 50 micrometers. Other grid or cell pitches (or second cell dimensions) are also contemplated, however, including, but not limited to, between about 5 micrometers and about 200 micrometers, between about 10 micrometers and about 100 micrometers, between about 20 micrometers and about 80 micrometers, and between about 30 micrometers and about 70 micrometers.

By arranging or configuring conductive ITO traces into a smaller grid or spatial arrangement on the main touchscreen or touch panel 90, however, a region configured to detect and resolve fingerprints can be formed. By having a user swipe his or her finger through such a dedicated fingerprint reading region or portion of the main touchscreen or touch panel 90, a fingerprint image can be constructed from, by way of example, a sequence of images, measurements or fingerprint frames taken simultaneously, sequentially or otherwise.

The acquired measurements, images or frames are then processed, data are extracted from them, and the extracted data are compared to data corresponding to an authenticated user's fingerprint. If a sufficiently good match between the two sets of data is obtained, the user is verified as an authenticated user.

In one embodiment, the relatively small capacitive sensing fingerprint sensing, measurement or reading area or region may be connected electrically in parallel at all times with the main navigation portion of touchscreen or touch panel 90, or may be disconnected or electrically connected separately from the main navigation portion of touchscreen or touch panel 90 through the use of thin film transistors ("TFTs") or switches, such as those of the type commonly employed on glass substrates used in conjunction with liquid crystal displays ("LCDs").

Such separate or disconnectable configurations may be advantageous because the mutual capacitance of the smaller fingerprint sensing region, portion or area 160 (see FIGS. 6 and 7) has a much smaller grid pitch than the navigation portion of touchscreen or touch panel 90, and thus the analog sensing circuit(s) which are employed in conjunction therewith can resolve much smaller mutual capacitance signals of the higher resolution required to reliably and accurately detect fingerprint images, measurements, or frames, and can also exhibit better noise immunity characteristics than when connected in parallel with those grid portions of touchscreen or touch panel 90 that are associated with navigation.

TFT switches can also be used in the larger navigation portion of touchscreen or touch panel 90 to separate the larger and smaller capacitive sensing regions of touchscreen 90 to effect power savings.

Figure 5:
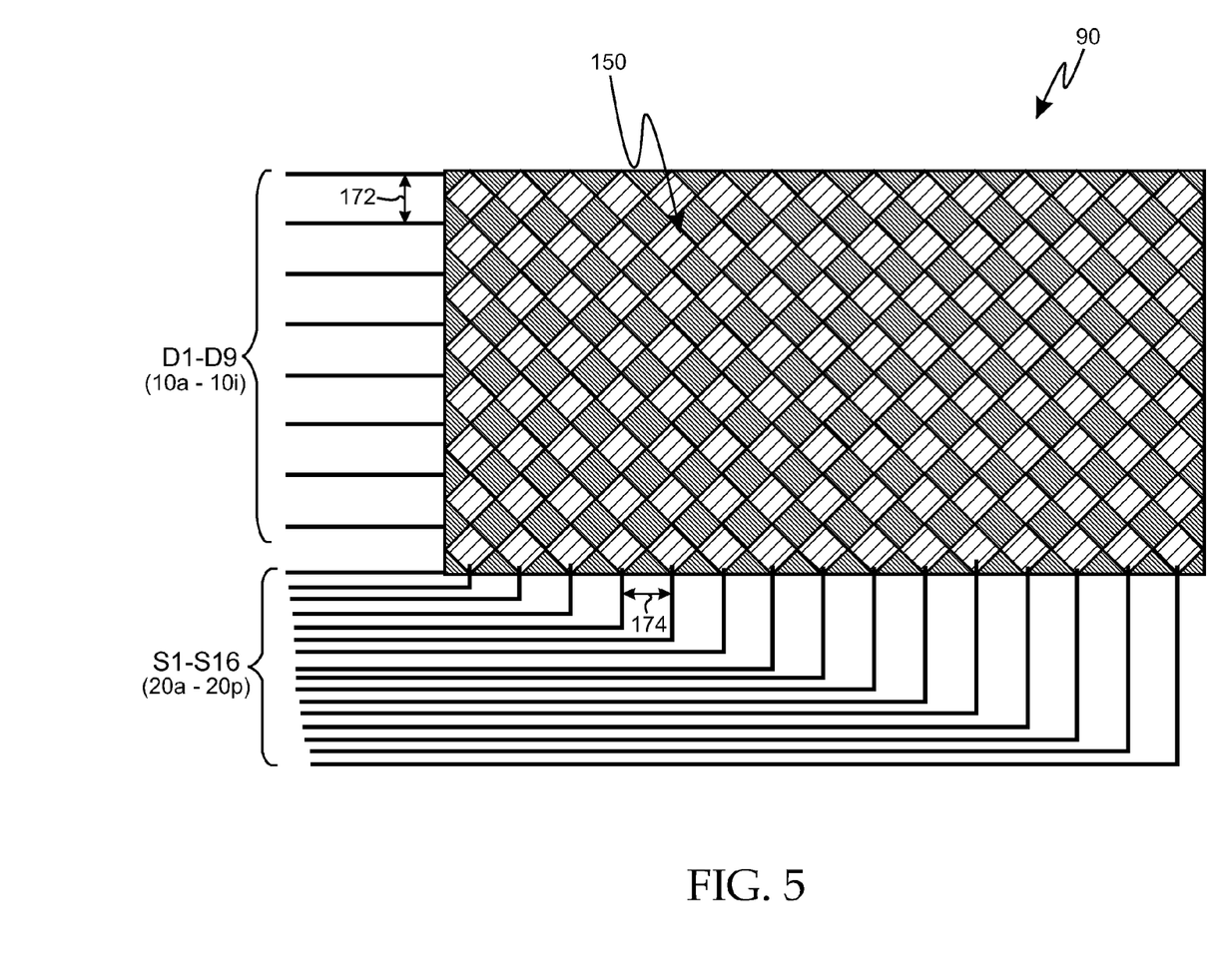
FIG. 5 shows one embodiment of a touchscreen or touch panel comprising a navigation area or region 150.

Referring now to FIG. 5, there is shown one embodiment of a touchscreen 90 comprising drive lines or electrodes S1-S16 (20a-20p) and drive lines or electrodes D1-D9 (10a-10p). The intersections between the sense and drive lines or electrodes form first groups of individual cells having first cell dimensions associated therewith that are appropriate for conventional finger or hand navigation over large region or area 150. As further shown in FIG. 5, drive lines or electrodes D1-D9 having a spacing 172, and sense lines or electrodes S1-S16 have a spacing 174, where spacings 172 and 174 correspond to a grid spacing of the first group of cells that is suitable for detecting, sensing or tracking on touchscreen or touch panel 90 as a finger or hand navigates thereacross.

Figure 6:
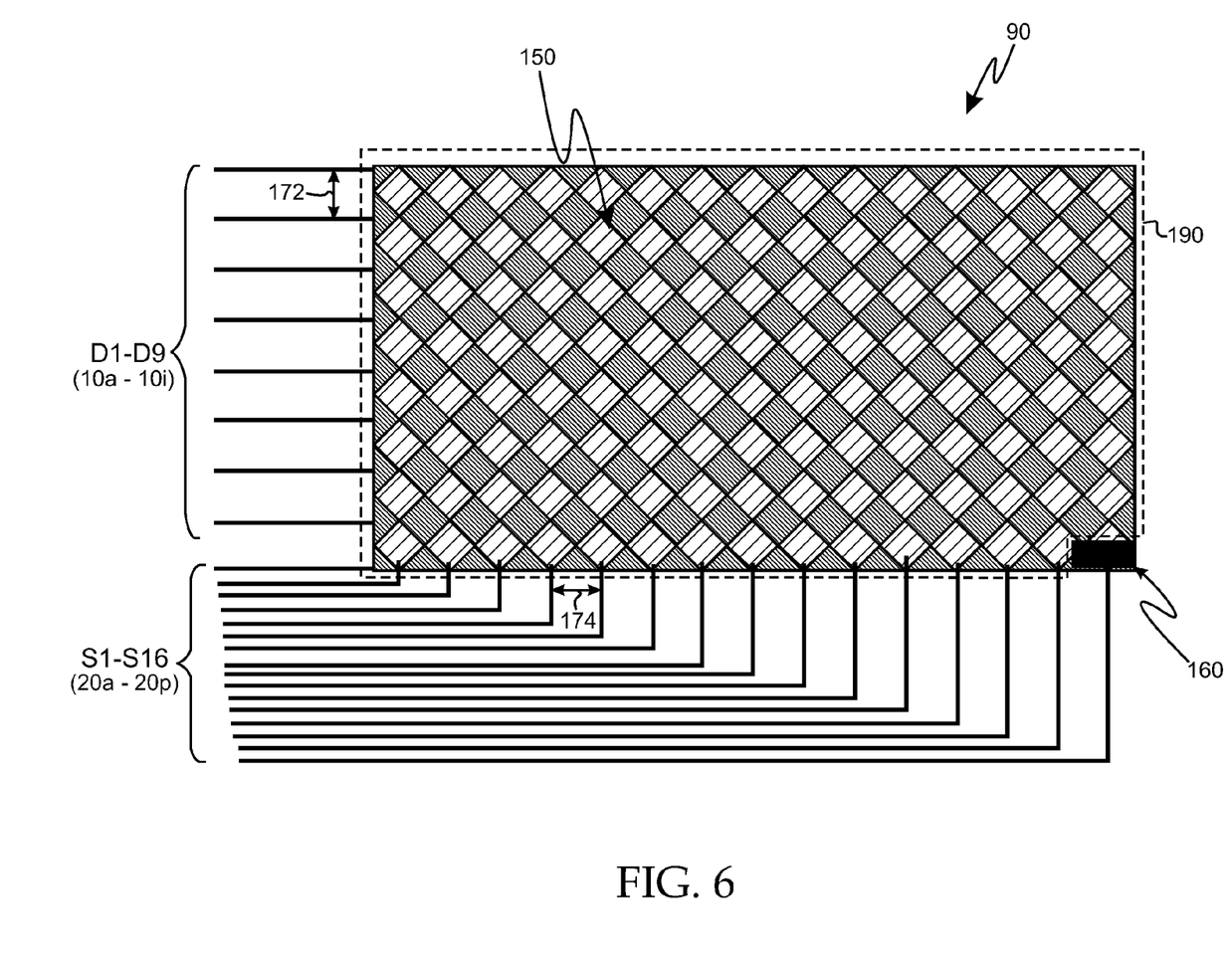
FIG. 6 shows one embodiment of a touchscreen or touch panel comprising a navigation area or region 150 and a fingerprint reading or sensing area 160.

FIG. 6 shows another embodiment of touchscreen or touch panel 90, where small high-resolution capacitive sensing region or area 160 is incorporated into the right-hand lower corner of touchscreen or touch panel 90 to form a second group of cells having second cell dimensions associated therewith that are suitable for fingerprint detection or sensing over region or area 160. As further shown in FIG. 6, drive lines or electrodes D1-D9 having a spacing 172, and sense lines or electrodes S1-S16 have a spacing 174, where spacings 172 and 174 correspond to the grid spacing of the first group of cells.

Other positions for small high-resolution capacitive sensing region or area 160 are also contemplated, such as any one or more of the remaining three corners of touchscreen or touch panel 90 in FIG. 6, the center of touchscreen or touch panel 90 in FIG. 6, along one of the edges of touchscreen or touch panel 90 in FIG. 6, or any other suitable location thereon. In the configuration of touchscreen or touch panel 90 shown in FIG. 6, sense line S16 is electrically connected to small high-resolution capacitive sensing region or area 192, although other sense line or electrode connecting and/or switching configurations are also contemplated, as discussed in detail above.

In FIG. 6, perimeter 190 delineates the approximate extent of the main navigation portion 150 of touchscreen or touch panel 90 and the first group of cells corresponding thereto. As shown in FIG. 6, and according to one embodiment, fingerprint detecting or sensing region or area 160 is disposed alongside or in close proximity to a portion of main navigation area or region 150. In other embodiments not shown in the Figures, fingerprint detecting or sensing region or area 160 is not disposed alongside or in close proximity to a portion of main navigation area or region 150, and instead may be separated therefrom by a capacitively inactive region of touchscreen or touch panel 90.

Figure 7:
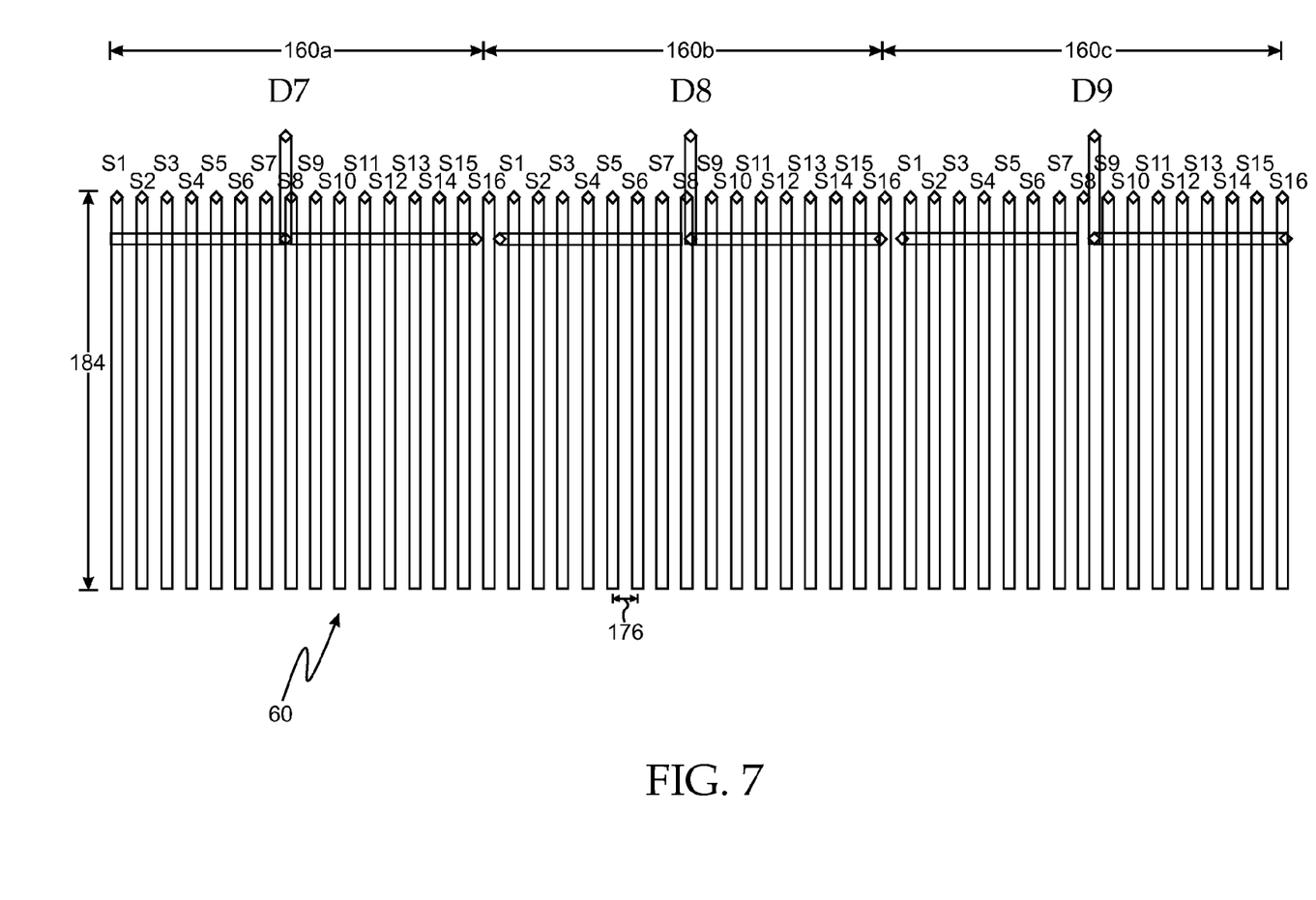
FIG. 7 shows one embodiment of a fingerprint reading or sensing area 160.

FIG. 7 shows one embodiment of the arrangement of drive and sense lines or electrodes in fingerprint detecting or sensing region or area 160 corresponding to the second group of cells 160, which have a much finer pitch or spacing 176 than those corresponding to the first group of cells 150 shown in FIGS. 5 and 6. In the embodiment of fingerprint detecting or sensing region or area 160 shown in FIG. 7, the grid or cell spacing 176 of the second group of cells is about 50 micrometers along at least one dimension, although other cell pitches or spacings are contemplated as discussed above. Note that the x and y dimensions of the cells in the first and second groups of cells need not be uniform, equal or constant with respect to one another, and can be varied according to the particular design and application requirements at hand.

Continuing to refer to FIG. 7, it will be seen that fingerprint detecting or sensing region or area 160 is partitioned into three different sub-regions 160a, 160b and 160c, each of which is connected electrically to drive lines D7, D8 and D9, respectively. Sense lines S1 through S16 in each of sub-regions 160a, 160b and 160c form high-resolution imaging areas suitable for reading or sensing a fingerprint or a portion of a fingerprint. As discussed above, fingerprint sensing in each of sub-regions 160a through 160c may occur in parallel with or simultaneously in respect of navigation sensing over region 150, or may be accomplished separately through the use of appropriate multiplexing or switching circuitry.

In some embodiments, processing of capacitive fingerprint frames by touchscreen controller 100 may be carried out in accordance with some of the teachings set forth in U.S. Pat. No. 7,116,805 to Machida entitled "Fingerprint Verification Device," U.S. Pat. No. 7,274,808 to Baharav et al. entitled "Imaging System and Apparatus for Combining Finger Recognition and Finger Navigation," U.S. Pat. No. 7,460,109 to Safai et al. entitled "Navigation and Fingerprint Sensor," and U.S. Pat. No. 7,853,055 to Machida entitled "Fingerprint Verification Device," all of which patents are assigned to Avago Technologies ECBU IP, and all of which are hereby incorporated by reference herein, each in its respective entirety. Although the foregoing patents are directed to optically detected fingerprints, the frame processing techniques described therein may be adapted for use in the capacitively-based frames discussed and disclosed herein, as those skilled in the art will appreciate upon having read and understood the specification and drawings of the present patent application.

In one embodiment, a cover glass or plastic layer disposed over region 160 may be made thinner than other portions of such a cover glass layer disposed over region 150 so that fingerprint resolution may be increased in fingerprint sensing region 160.

Figure 8:
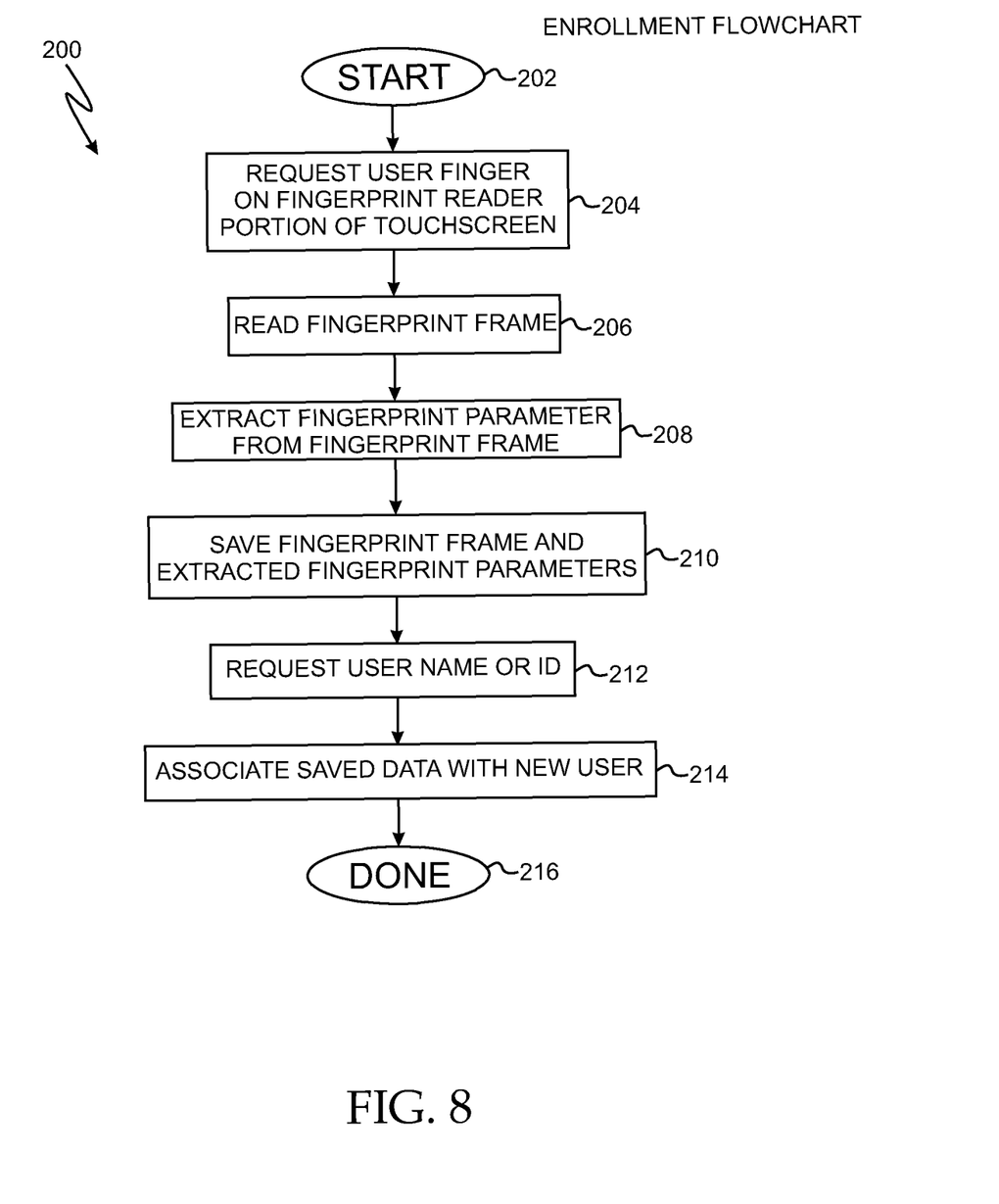
FIG. 8 shows one embodiment of a method for enrolling an authorized or verified user's fingerprint.

Referring now to FIG. 8, there is shown one embodiment of a method of enrolling an authorized or verified user of a device to which touchscreen or touch panel 90 is operably connected, such as an LCD, a computer display, a laptop computer, a personal data assistant (PDA), a mobile telephone, a radio, an MP3 player, a portable music player, a stationary device, a television, a stereo, an exercise machine, an industrial control, a control panel, an outdoor control device, a household appliance, or any other suitable electronic device. In one embodiment, such an the electronic device is initially set up by an authorized user and touchscreen controller 100 through an enrollment process where touchscreen controller 100 extracts characteristics or parameters from at least one authorization image or frame corresponding to the authorized users' fingerprints.

In FIG. 8, method 200 begins by requesting at step 204 that the authorized user place or swipe his or her finger on fingerprint detecting region 160. A signal frame or image is acquired by capacitive touchscreen system 110 and controller 100 at step 206. After the image or frame has been acquired, and in one embodiment as shown at step 208, touchscreen controller 100 examines the acquired fingerprint image or frame, and extracts parameters or characteristics associated with the fingerprint image or frame, by, for example, identifying significant peaks and valleys, their locations respecting one another, in the acquired image or frame, or other pertinent characteristics thereof. For the authorized user's fingerprint image or frame, relative row and column positions of peaks, valleys, fingerprint contact size, signal peak strength, fingerprint contact shape and/or any other suitable parameters are extracted from the image or frame by touchscreen controller 100. The resulting set of fingerprint parameters or characteristics computed in step 208 is then saved or stored in memory, firmware, hardware circuitry, or in a storage device operably connectable to or forming a portion of touchscreen controller 100 at step 210. At step 212 the authorized user is requested to provide a name or ID, and at step 214 the stored or saved set of fingerprint parameters or characteristics is associated with the authorized user. Multiple sets of fingerprint parameters or characteristics can be generated and stored that correspond to different authorized or verified users of the electronic device. Finishing the steps of method 200 at step 216 shown in FIG. 8 completes a normal enrollment phase. Abnormal enrollment can also be detected at any stage in method 200 by detecting undesired or adverse conditions such as the user not actually placing or swiping his or her finger on region 160, or the user placing or swiping his or her finger on region 160 in manner that is not appropriate for enrollment purposes.

Figure 9:
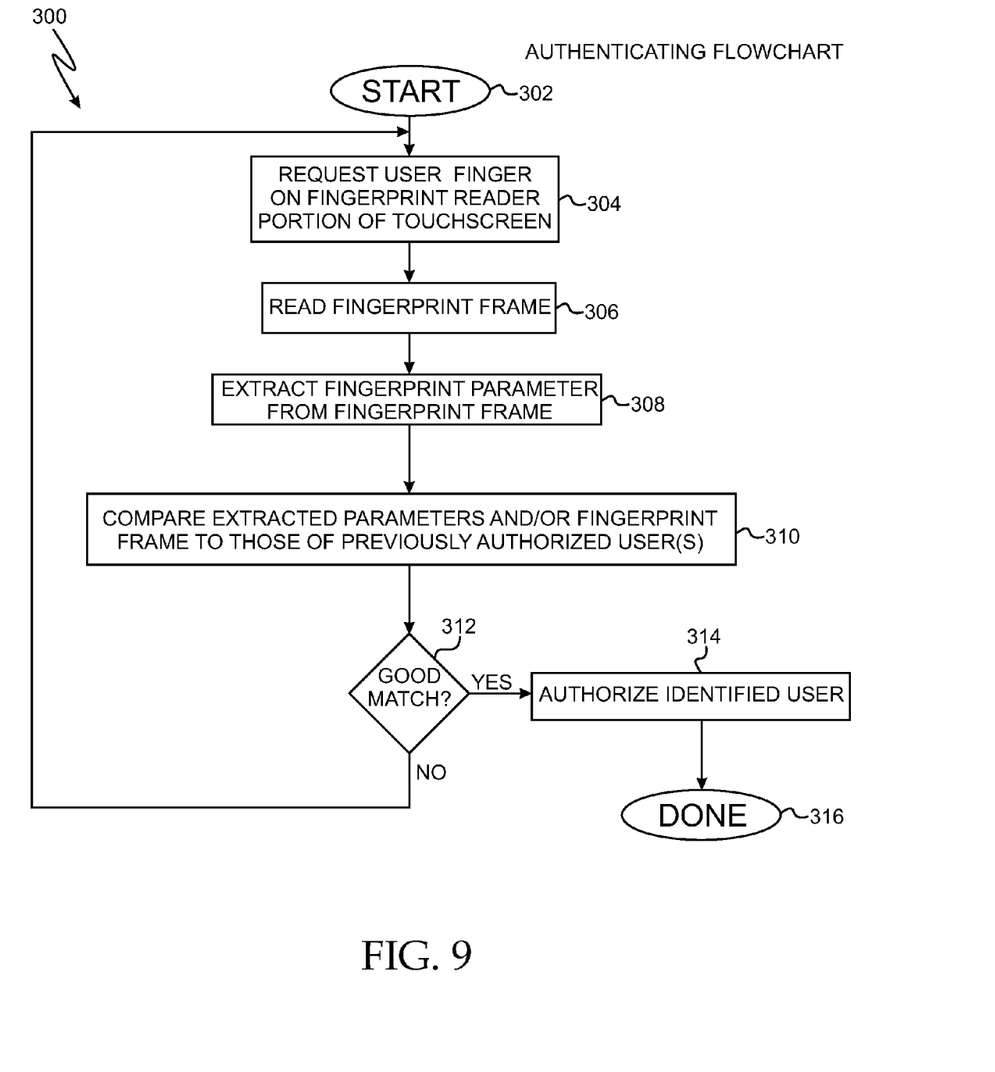
FIG. 9 shows one embodiment of a method for verifying an authorized or verified user's fingerprint.

Referring now to FIG. 9, there is shown one embodiment of a method corresponding to some of the user authorization or verification techniques and devices disclosed herein. Method 300 begins by requesting at step 304 that a user place or swipe his or her finger on fingerprint reading or sensing region 160. A signal frame or image is acquired by capacitive touchscreen system 110 and touchscreen controller 100 at step 306. After the image or frame has been acquired, and in one embodiment as shown at step 308, touchscreen controller 100 examines the acquired fingerprint image or frame, and extracts parameters or characteristics associated with the fingerprint image or frame, by, for example, identifying significant peaks and valleys and their locations respecting one another, or other characteristics, in the acquired image or frame. For the authorized user's fingerprint image or frame, relative row and column positions of peaks, valleys, fingerprint contact size, signal peak strength, fingerprint contact shape and/or any other suitable parameters are extracted from the image or frame by touchscreen controller 100. This first set of fingerprint parameters or characteristics extracted by touchscreen controller 100 from the acquired image or frame is then compared at step 310 to a stored second set of fingerprint parameters or characteristics corresponding to a previously authorized or verified user. If a good match between the first and second sets of characteristics is obtained at step 312, the user is authorized as a verified user.

Various embodiments of the invention are contemplated in addition to those disclosed hereinabove. The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

I claim:

1. A capacitive touchscreen or touch panel system, comprising:
a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect to form first and second groups of individual cells having first and second cell dimensions associated therewith, respectively, all of the first cell dimensions being identical to each other, all of the second cell dimensions being identical to each other, each of the first cell dimensions being different from each of the second cell dimensions, the second group of individual cells including multiple sub-regions, traces of the second group of individual cells in different sub-regions being connected to a same one of the second plurality of electrically conductive sense electrodes, the mutual capacitances changing in the presence of one or more fingers of a user or touch devices brought into proximity thereto;

drive circuitry operably connected to the first plurality of drive electrodes, and at least first sense circuitry operably connected to the second plurality of sense electrodes of the first group and the second group, wherein the first group and first cell dimensions are configured to permit the detection by the first sense circuitry of the presence of the one or more fingers of the user or touch devices brought into proximity thereto, and the second group and second cell dimensions form a fingerprint reader configured to permit at least one fingerprint from the user's finger to be read by the first sense circuitry associated therewith.

2. The touchscreen or touch panel system of claim 1, wherein the first and second groups of the second plurality of sense electrodes are operably connected to the first sense circuitry at the same time.

3. The touchscreen or touch panel system of claim 1, wherein at any given time at least one of the first group and the second group is operably connected to the first sense circuitry.

4. The touchscreen or touch panel system of claim 3, wherein the first group or the second group is operably connected to the first sense circuitry via controllable switches.

5. The touchscreen or touch panel system of claim 4, wherein the controllable switches are operably connected to at least one of the first plurality of electrodes and the second plurality of electrodes.

6. The touchscreen or touch panel system of claim 4, wherein the controllable switches are thin film transistors.

7. The touchscreen or touch panel system of claim 4, wherein the first plurality of electrodes and the second plurality of electrodes are disposed on a glass substrate.

8. The touchscreen or touch panel system of claim 1, wherein the second group is located in a distinct and separate region of the touchscreen apart from the first group.

9. The touchscreen or touch panel of claim 8, wherein the first group is defined by an outer perimeter.

10. The touchscreen or touch panel of claim 9, wherein at least a portion of the outer perimeter adjoins at least a portion of the first group.

11. The touchscreen or touch panel system of claim 1, wherein the second group of cells is located near or in a corner of the touchscreen.

12. The touchscreen or touch panel system of claim 1, wherein the second group forms a rectangle, square, circle or oval.

13. The touchscreen or touch panel system of claim 1, wherein the at least first sense circuitry further comprises first sense circuitry operably connected to the second plurality of sense electrodes of the first group, and second sense circuitry operably connected to the second plurality of sense electrodes of the second group.

14. The touchscreen or touch panel system of claim 1, wherein first data associated with one or more fingers of the user or touch devices being brought into proximity to the touchscreen or touch panel thereto and second data associated with reading the at least one fingerprint are processed by a single touchscreen controller.

15. The touchscreen or touch panel system of claim 1, wherein the first group of individual cells has cell dimensions associated therewith ranging between about 4 mm and about 6 mm, between about 3 mm and about 7 mm, between about 2 mm and about 8 mm, and between about 1 mm and about 10 mm.

16. The touchscreen or touch panel system of claim 1, wherein the second group of individual cells has cell dimensions associated therewith ranging between about 5 micrometers and about 200 micrometers, between about 10 micrometers and about 100 micrometers, between about 20 micrometers and about 80 micrometers, and between about 30 micrometers and about 70 micrometers.

17. A method of detecting touches or near-touches and an authorized user's fingerprint on a capacitive touchscreen or touch panel system, the system comprising a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect to form first and second groups of individual cells having first and second cell dimensions associated therewith, respectively, all of the first cell dimensions being identical to each other, all of the second cell dimensions being identical to each other, each of the first cell dimensions being different from each of the second cell dimensions, the second group of individual cells including multiple sub-regions, traces in different sub-regions being connected to a same one of the second plurality of electrically conductive sense electrodes, the mutual capacitances changing in the presence of one or more fingers of a user or touch devices brought into proximity thereto, drive circuitry operably connected to the first plurality of drive electrodes, and at least first sense circuitry operably connected to the second plurality of sense electrodes of the first group and the second group, wherein the first group and first cell dimensions are configured to permit the detection by the first sense circuitry of the presence of the one or more fingers of the user or touch devices brought into proximity thereto, and the second group and second cell dimensions form a fingerprint reader configured to permit at least one fingerprint from the user's finger to be read by the first sense circuitry associated therewith, the method comprising sensing at least one touch or near touch of a finger, finger portion, hand or hand portion brought into proximity to the first group on the touchscreen or touch panel.

18. The method of claim 17, further comprising, and acquiring a fingerprint frame of the user's finger brought into contact with at least a portion of the second group on the touchscreen or touch panel.

19. The method of claim 18, further comprising extracting fingerprint parameters associated with the fingerprint frame.

20. The method of claim 19, further comprising saving the extracted fingerprint parameters in a memory.

21. The method of claim 20, wherein the acquiring, extracting and saving steps are associated with an enrollment phase for the user.

22. The method of claim 21, further comprising requesting the user's name or ID as part of the enrollment phase.

23. The method of claim 20, wherein the acquiring and extracting steps are associated with an authentication phase for the user.

24. The method of claim 23, further comprising comparing the extracted fingerprint parameters to authorized user fingerprint parameters stored in a memory.

25. The method of claim 24, further comprising determining whether the extracted fingerprint parameters and the authorized user fingerprint parameters match sufficiently well that the extracted fingerprint parameters are determined to be associated with the authorized user.

26. The method of claim 17, further comprising operably connecting the first group or the second group to the first sense circuitry via controllable switches.

27. The method of claim 26, further comprising operably connecting the controllable switches to at least one of the first plurality of electrodes and the second plurality of electrodes.

28. The method of claim 17, further comprising operably connecting the first sense circuitry operably connected to the second plurality of sense electrodes of the first group, and second sense circuitry to the second plurality of sense electrodes of the second group.

29. The method of claim 17, further comprising processing first data associated with one or more fingers of the user or touch devices being brought into proximity to the touchscreen or touch panel thereto and associating second data with reading the at least one fingerprint.

30. The method of claim 17, further comprising processing the first and second data with a single touchscreen controller.

* * * * *